United States Patent
Kondo et al.

(10) Patent No.: US 7,131,410 B2
(45) Date of Patent: Nov. 7, 2006

(54) SOLENOID SPOOL VALVE (75) Inventors: Jiro Kondo, Kariya (JP); Takashi Yamaguchi, Obu (JP)

(73) Assignee: Denso Corporation (JP)

( * ) Notice: Subject to any disclaimer, the term of this patent is extended or adjusted under 35 U.S.C. 154(b) by 107 days.

(21) Appl. No.: 11/017,663

(22) Filed: Dec. 22, 2004

(65) Prior Publication Data

US 2006/0162682 A1    Jul. 27, 2006

(30) Foreign Application Priority Data

Dec. 25, 2003  (JP)  ............................. 2003-430570

(51) Int. Cl.
*F01L 1/34* (2006.01)
(52) U.S. Cl. ............... 123/90.17; 123/90.15; 123/90.31; 137/625.65; 137/625.64
(58) Field of Classification Search ............ 123/90.15, 123/90.17, 90.31; 137/625.64, 625.65
See application file for complete search history.

(56) References Cited

U.S. PATENT DOCUMENTS 4,587,991 A * 5/1986 Chorkey .................. 137/454.6

6,308,672 B1 * 10/2001 Lichti et al. ............. 123/90.17

FOREIGN PATENT DOCUMENTS

JP    2001-108135    4/2001

* cited by examiner

*Primary Examiner*—Thomas Denion
*Assistant Examiner*—Zelalem Eshete
(74) *Attorney, Agent, or Firm*—Nixon & Vanderhye PC (57) ABSTRACT

A solenoid spool valve includes a spool valve, a spring, and an electromagnetic actuator. The spool valve has a generally cylindrical sleeve provided with a fluid input port and a fluid output port and a spool supported in the sleeve for axial displacement to switch between said input and output ports. The spring abuts a first working face of said spool to energize said spool in a first axial direction. The electromagnetic actuator provides an axial drive force to a second working face of said spool in a second axial direction that is substantially opposite to said first axial direction. The first and second working faces are disposed axially inside of both axial end portions of a bearing, respectively, for slidably supporting said spool in said sleeve.

5 Claims, 4 Drawing Sheets

SOLENOID SPOOL VALVE

CROSS REFERENCE TO RELATED APPLICATIONS

This application is based upon and claims the benefit of priority of Japanese Patent Application No. 2003-430570, filed on Dec. 25, 2003, the contents of which are incorporated herein by reference.

FIELD OF THE INVENTION

The present invention relates to solenoid spool valves for driving a spool valve using an electromagnetic actuator and, more particularly, to a technique suitable to a solenoid spool valve which an oil-flow control valve (OCV) actuates the electromagnetic actuator to switch a flow of oil.

BACKGROUND OF THE INVENTION

A solenoid spool valve includes a spool valve, a spring, and an electromagnetic actuator. The spool valve has a generally cylindrical sleeve provided with input and output ports, and a spool supported axially slidably within the sleeve to switch between the input and output ports. The spring serves as an energizer that abuts against one end face of the spool to push the spool back toward the electromagnetic actuator. The electromagnetic actuator is a linear actuator that applies a driving axial force to the other end face of the spool to push the spool axially toward one side against the energizing force exerted by the spring (e.g., see Japanese Patent Laid-Open Publication No. 2001-108135).

An inclination or misalignment of the spring may cause a diagonal force on the spool. Likewise, an inclination or misalignment of a pressure-applying member (e.g., a shaft or a member for transferring a force produced on the plunger of the electromagnetic actuator to the spool) may also cause a diagonal force on the spool. Here, the sleeve includes bearings for slidably supporting the spool. The bearing has a clearance between the spool and the sleeve for allowing the spool to slide.

The inclination of the spool is restricted at both of the axial end portions of the bearing (at the outermost ends of all the bearings supporting the spool). However, the conventional spool valve was configured such that portions (working faces) subjected to the forces of the spring and the electromagnetic actuator were disposed outside the both axial end portions of the bearing. Thus, the points of effort force (the working faces) stayed outside the fulcrums (the outer end portions of the bearing). In this arrangement, an inclination or misalignment of the spring or the pressure-applying member would cause a radial load (a force pushing the bearing) imposed by the spool on the bearing to increase based on the principle of lever.

On the other hand, many examples exist in which part of the spool protrudes excessively from the axial end portion of the bearing. The spool having an excessively protruded portion from the axial end of the bearing would cause a heavy radial load on the bearing due to the weight of the protruded portion. The heavy radial load imposed by the spool on the bearing causes part of the bearing and part of the spool to rub hard against each other resulting in an increase in friction, thereby impeding smooth movement of the spool.

Furthermore, the working faces acted upon by the forces of the spring and the electromagnetic actuator stayed axially outside the bearing, thereby causing an increase in entire length of the spool valve.

SUMMARY OF THE INVENTION

The present invention was developed in view of the aforementioned problems. It is therefore an object of the invention to provide a solenoid spool valve that restricts a radial load imposed by a spool on a bearing to allow the spool to move smoothly. In this solenoid spool valve, a spring energizes one side of the spool and an electromagnetic actuator exerts an axial drive force on the other side of the spool.

A solenoid spool valve is provided in which a spring energizes one side of a spool and an electromagnetic actuator exerts a pressure-applying face on the other side of the spool. In this solenoid spool valve, the spool likely imposes a radial load on a bearing due to an inclination or misalignment of the spring or a pressure-applying member.

In this context, the solenoid spool valve employs a structure having a first working face and a second working face axially inside both the axial end portions of the bearing that slidably supports the spool in the sleeve. In this arrangement, the spring applies an energizing force to the spool on the first working face, and the electromagnetic actuator applies an axial drive force to the spool on the second working face.

This arrangement allows the points of effort force (the first and second working faces) to stay inside the fulcrums (both the end portions of the bearing). Based on the principle of lever, this arrangement minimizes a radial load (a force pushing the bearing) that is imposed on the bearing due to an inclination or misalignment of the spring and the pressure-applying member.

This arrangement also prevents part of the spool from protruding excessively from an axial end of the bearing. This serves to avoid a problem that a radial load is produced on the bearing due to the self-weight of the portion of the spool excessively protruding from the axial end of the bearing.

Since the radial load imposed on the bearing is minimized, it is possible to avoid a drawback that part of the bearing and part of the spool rub hard against each other resulting in an increase in friction, thereby allowing the spool to move smoothly.

Furthermore, since the first and second working faces stay within both the end portions of the bearing, it is possible to reduce the space in which the spring and the pressure-applying member are installed, thereby decreasing the entire length of the spool valve.

Another aspect of the present invention includes a second working face of a solenoid spool valve having a structure formed on a bottom face of an axially recessed portion at an end portion of the spool on the electromagnetic actuator side. The bottom face of the recessed portion serving as the second working face is tapered and opened toward the electromagnetic actuator. A spherical shape is given to the pressure-applying face of the pressure-applying member on the electromagnetic actuator side for pushing the bottom face of the recessed portion serving as the second working face.

This arrangement allows the pressure-applying member to be sustained and attracted toward the axial center of the spool, thereby preventing a misalignment of the pressure-applying member on the second working face. On the other hand, the contact of the second working face is realized between a tapered face and a spherical surface, thereby being stabilized even in the presence of an inclination of the pressure-applying member. Thus, this prevents a radial load (a force pushing the bearing) resulting from an inclination or misalignment of the pressure-applying member on the bearing, thereby allowing the spool to smoothly slide.

In another aspect of the present invention, the first and second working faces of the solenoid spool valve are formed on a bottom face of an axially recessed portion at the both end portions of the spool.

This arrangement enables the first and second working faces to be disposed axially inside both the axial end portions of the bearing.

In yet another aspect of the present invention, the first and second working faces of the solenoid spool valve are disposed axially inside both the axial end portions of the bearing in the sleeve irrespective of the presence of operation of the electromagnetic actuator.

This arrangement makes it always possible to minimize a radial load imposed on the bearing irrespective of the presence of operation of the electromagnetic actuator.

In still another aspect of the present invention, each of the first and second working faces of the solenoid spool valve are disposed near both the axial end portions of the bearing in the sleeve.

A still further aspect of the present invention includes an OCV configured such that the radial load imposed by the spool on the bearing is reduced, thereby allowing the spool to move smoothly. The OCV is combined with a valve-timing variable mechanism (hereinafter referred to as VCT), such that during actuation of the internal combustion engine, a hydraulic pressure produced in a hydraulic pressure source is relatively supplied to or released from the advanced-angle chamber or the retarded-angle chamber.

The OCV that allows the spool to slide smoothly is employed for the valve-timing variable device (hereinafter referred to as VTT) which includes a hydraulic circuit and a VCT, thereby allowing the performance of the VTT to be enhanced.

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENTS

A solenoid spool valve according to a first embodiment includes a spool valve having a cylindrical sleeve and a spool supported axially slidably within the sleeve, a spring abutting against a first working face on one side of the spool, and an electromagnetic actuator for providing an axial drive force to a second working face on the other side of the spool.

The first and second working faces are disposed axially inside both axial end portions of a bearing for slidably supporting the spool in the sleeve.

A first embodiment will be described with reference to FIGS. 1 to 3, in which the present invention is applied to an OCV that is used for a hydraulic circuit of a VVT.

First, the VVT will be described referring to FIG. 2.

The VVT shown in the first embodiment is attached to a camshaft (any camshaft for an intake valve, an exhaust valve, or an intake and exhaust valve) for an internal combustion engine (hereinafter referred to as an engine), and capable of continuously varying the timing of opening and closing the valve.

The VVT includes a VCT 1, a hydraulic circuit 3 with an OCV 2, and an ECU (Electric Control Unit) 4 for controlling the OCV 2.

The VCT 1 includes a shoe housing 5 (corresponding to a rotationally driven body) which is rotationally driven in sync with the crankshaft of the engine, and a vane rotor 6 (corresponding to a rotation follower) which is provided rotatably relative to the shoe housing 5 and rotates integrally with the camshaft. The VCT 1 also allows a hydraulic actuator included in the shoe housing 5 to rotationally drive the vane rotor 6 relative to the shoe housing 5, thereby allowing the camshaft to displace toward the advanced or retarded angle side.

For example, the shoe housing 5 is bolted to a sprocket, which is rotationally driven by the crankshaft of the engine through a timing belt or a timing chain, to rotate integrally with the sprocket. As shown in FIG. 2, there are formed a plurality of generally sector-shaped recessed portions 7 (three in the first embodiment) inside the shoe housing 5. The shoe housing 5 rotates clockwise in FIG. 2, the rotational direction of which is the advanced angle side.

On the other hand, for example, the vane rotor 6 is pinned for positioning at an end of the camshaft and then securely bolted to the end of the camshaft, and thus allowed to rotate integrally with the camshaft.

The vane rotor 6 has vanes 6a each of which divides the interior of each of the recessed portions 7 of the shoe housing 5 into an advanced-angle chamber 7a and a retarded-angle chamber 7b. The vane rotor 6 is disposed rotatably within a predetermined angle relative to the shoe housing 5.

The advanced-angle chamber 7a is a hydraulic chamber, which is formed in the recessed portion 7 on the anti-rotational direction side of the vane 6a, to drive the vane 6a toward the advanced angle side by hydraulic pressure. Conversely, the retarded-angle chamber 7b is a hydraulic chamber for driving the vane 6a toward the retarded angle side by hydraulic pressure. Each of the chambers 7a and 7b is tightly sealed using a sealing member 8 or the like.

The hydraulic circuit 3 is means for supplying or draining oil to or from the advanced-angle chamber 7a and the retarded-angle chamber 7b to create a difference in hydraulic pressure between the advanced-angle chamber 7a and the retarded-angle chamber 7b and thereby allow the vane rotor 6 to rotate relative to the shoe housing 5. The hydraulic circuit 3 includes an oil pump 9 to be driven by the camshaft or the like and the OCV 2 for selectively supplying oil, which is fed under pressure by the oil pump 9, to the advanced-angle chamber 7a or the retarded-angle chamber 7b.

Now, the structure of the OCV 2 will be described with reference to FIG. 3.

The OCV 2, an example of the solenoid spool valve, is a combination of a spool valve 10 made up of a sleeve 11 and a spool 12, and an electromagnetic actuator 13 for axially driving the spool 12. The OCV 2 is secured to the engine (an attachment member) using a bracket (not shown) or the like.

The sleeve 11 has a generally cylindrical shape and a plurality of input and output ports. More specifically, the sleeve 11 according to the first embodiment has a bore 11*a* which slidably axially supports the spool 12, and a hydraulic pressure supply port 11*b* which communicates with an oil discharge outlet of the oil pump 9. The sleeve 11 also includes an advanced-angle chamber communication port 11*c* which communicates with the advanced-angle chamber 7*a*, a retarded-angle chamber communication port 11*d* which communicates with the retarded-angle chamber 7*b*, and drain ports 11*e* for draining oil back into an oil pan 9*a*.

The hydraulic pressure supply port 11*b*, the advanced-angle chamber communication port 11*c*, and the retarded-angle chamber communication port 11*d* are bored on the side of the sleeve 11. The drain port 11*e*, the advanced-angle chamber communication port 11*c*, the hydraulic pressure supply port 11*b*, the retarded-angle chamber communication port 11*d*, and the drain port 11*e* are formed from the left (the anti-coil side) to the right (the coil side) in FIG. 3.

The spool 12 includes four increased-diameter portions 12*a* (lands) which are intended to block the ports and which have an outer diameter approximately equal to the inner diameter of the sleeve 11 (the diameter of the bore 11*a*).

An advanced-angle chamber draining reduced-diameter portion 12*b*, a hydraulic pressure supply reduced-diameter portion 12*c*, and a retarded-angle chamber draining reduced-diameter portion 12*d* are formed between each of the increased-diameter portions 12*a* to change the communication condition of the plurality of input and output ports (11*b* to 11*e*) in response to the axial position of the spool 12.

The advanced-angle chamber draining reduced-diameter portion 12*b* drains the hydraulic pressure of the advanced-angle chamber 7*a* while the retarded-angle chamber 7*b* is supplied with a hydraulic pressure. The hydraulic pressure supply reduced-diameter portion 12*c* supplies a hydraulic pressure to either one of the advanced-angle chamber 7*a* or the retarded-angle chamber 7*b*. The retarded-angle chamber draining reduced-diameter portion 12*d* drains the hydraulic pressure of the retarded-angle chamber 7*b* while the advanced-angle chamber 7*a* is supplied with a hydraulic pressure.

The electromagnetic actuator 13 includes a plunger 15, a stator 16, a coil 17, a yoke 18, and a connector 19.

The plunger 15 is formed of a magnetic metal that is magnetically attracted by the stator 16 (e.g., iron or a ferromagnetic material forming a magnetic circuit), and supported axially slidably inside the stator 16 (more specifically, inside an oil-sealing cup guide 20).

The stator 16 is a generally annular disc of a magnetic metal (e.g., iron or a ferromagnetic material forming a magnetic circuit) which is sandwiched between the sleeve 11 and the coil 17, with a main gap MG (magnetically attracting gap) formed between the inner circumferential portion of the stator 16 and the plunger 15.

The inner circumferential portion of the stator 16 receives an end portion of the plunger 15 without contacting therewith, and is disposed such that the stator 16 axially intersects part of the plunger 15. The inner circumferential portion of the stator 16 is provided with a tapered portion 16*a*, and has such a property that any amount of stroke of the plunger 15 will not affect magnetic attraction.

The coil 17 is magnetic force generation means for generating magnetic force when energized to allow the stator 16 to magnetically attract the plunger 15, and has a number of turns of enamel wire around a plastic bobbin 17*a*.

The yoke 18 is formed of a magnetic metal (e.g., iron or a ferromagnetic material forming a magnetic circuit) which surrounds the coil 17 to permit magnetic fluxes, and has claws formed on its end which are crimped on the sleeve 11 to be securely coupled thereto. The yoke 18 is provided on the inner circumference thereof with an inner cylindrical portion 18*a* which covers the entire circumference of part of the plunger 15, with the yoke 18 and the inner cylindrical portion 18*a* being magnetically coupled to each other. The inner cylindrical portion 18*a* serves to pass magnetic flux to and from the plunger 15, with a side gap SG (magnetic flux passing gap) between the plunger 15 and the inner cylindrical portion 18*a*.

The connector 19 is connecting means for electrically connecting to the ECU 4 via a connecting line, and has therein terminals 19*a* to be connected to both end portions of the coil 17, respectively.

Figure 3:
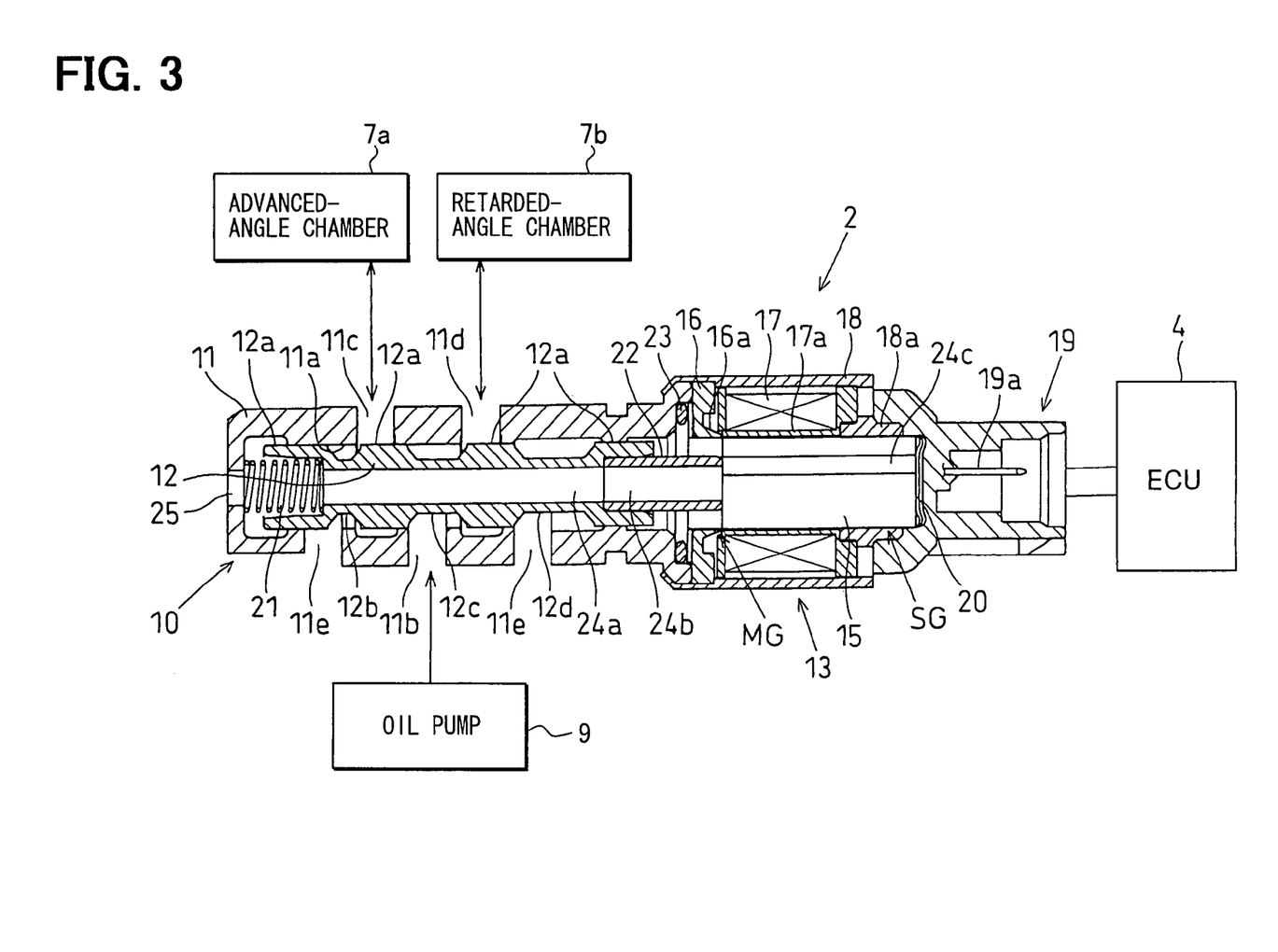
FIG. 3 is a detailed cross-sectional side view of the OCV of FIG. 1A.

The OCV 2 has a spring 21, disposed on the left side of the spool 12 in FIG. 3, for energizing the spool 12 and the plunger 15 toward the right side in FIG. 3.

On the right side of the spool 12 in FIG. 3, there is placed a shaft 22 for transferring the axial force of the plunger 15 to the spool 12.

The shaft 22, which is provided as a separate component from the spool 12 and the plunger 15, is sandwiched between the spool 12 and the plunger 15 so that the both ends of the shaft 22 abut against the spool 12 and the plunger 15.

The shaft 22 according to the first embodiment is inserted into a second recessed portion C2 (to be discussed later; see FIG. 1 for the reference symbol) formed at an end of the spool 12 and supported within the inner diameter of the second recessed portion C2. The shaft 22 may also be supported axially slidably on the inner circumferential face of a cylindrical collar disposed in the sleeve 11 or the stator 16. Alternatively, the shaft 22 can be fixed to the plunger 15 so that the plunger 15 supports the shaft 22.

With the coil 17 turned off, the OCV 2 allows the spool 12 and the plunger 15 to be displaced toward the coil (the right side in FIG. 3) by the energizing force exerted by the spring 21 and then stopped.

This stop position defines the maximum main gap MG, allowing the spool 12 to be positioned relative to the sleeve 11.

The reference symbol 23 shown in FIG. 3 indicates a sealing O-ring. An oil path 24*a* axially penetrating the spool 12, an oil path 24*b* axially penetrating the shaft 22, and an oil path 24*c* axially penetrating the plunger 15 are provided as a breathing passageway for communicating with a volume-variable space in the OCV 2. All these paths also communicate with an external lower-pressure portion via a drain port 25 formed at the left end portion of the sleeve 11 in FIG. 3.

The ECU 4 provides control to the amount of current to be supplied to the coil 17 of the electromagnetic actuator 13 (hereinafter referred to as the amount of supply current) through duty-ratio control. The ECU 4 controls linearly the axial position of the spool 12 by adjusting the amount of supply current through the coil 17. This allows for generating a working hydraulic pressure in the advanced-angle chamber 7*a* and the retarded-angle chamber 7*b* in response to the operating condition of the engine to provide variable control continuously to the advanced-angle phase of the camshaft.

Upon advancing the angle of the camshaft in response to the operating condition of the vehicle, the ECU 4 increases the amount of supply current through the coil 17. This results in an increase in the magnetic force produced by the coil 17, causing the plunger 15 and the spool 12 to move toward the anti-coil side (the left side in FIG. 3 or the advanced angle side). This in turn causes an increase in the ratio of communication of the hydraulic pressure supply port 11b and the advanced-angle chamber communication port 11c as well as an increase in the ratio of communication of the retarded-angle chamber communication port 11d and the drain ports 11e. This results in an increase in hydraulic pressure of the advanced-angle chamber 7a, whereas resulting in a decrease in hydraulic pressure of the retarded-angle chamber 7b. This in turn causes the vane rotor 6 to displace toward the advanced angle side relative to the shoe housing 5 and the camshaft to be advanced in angle.

Conversely, upon retarding the camshaft in response to the operating condition of the vehicle, the ECU 4 decreases the amount of supply current through the coil 17. This results in a decrease in the magnetic force produced by the coil 17, causing the plunger 15 and the spool 12 to move toward the coil side (the right side in FIG. 3 or the retarded angle side). This in turn causes an increase in the ratio of communication of the hydraulic pressure supply port 11b and the retarded-angle chamber communication port 11d as well as an increase in the ratio of communication of the advanced-angle chamber communication port 11c and the drain ports 11e. This results in an increase in hydraulic pressure of the retarded-angle chamber 7b, whereas resulting in a decrease in hydraulic pressure of the advanced-angle chamber 7a. This in turn causes the vane rotor 6 to displace toward the retarded angle side relative to the shoe housing 5 and the camshaft to be retarded in angle.

Now, the supporting structure of the spool 12 in the spool valve 10 will be described with reference to FIG. 1.

Figure 1A:
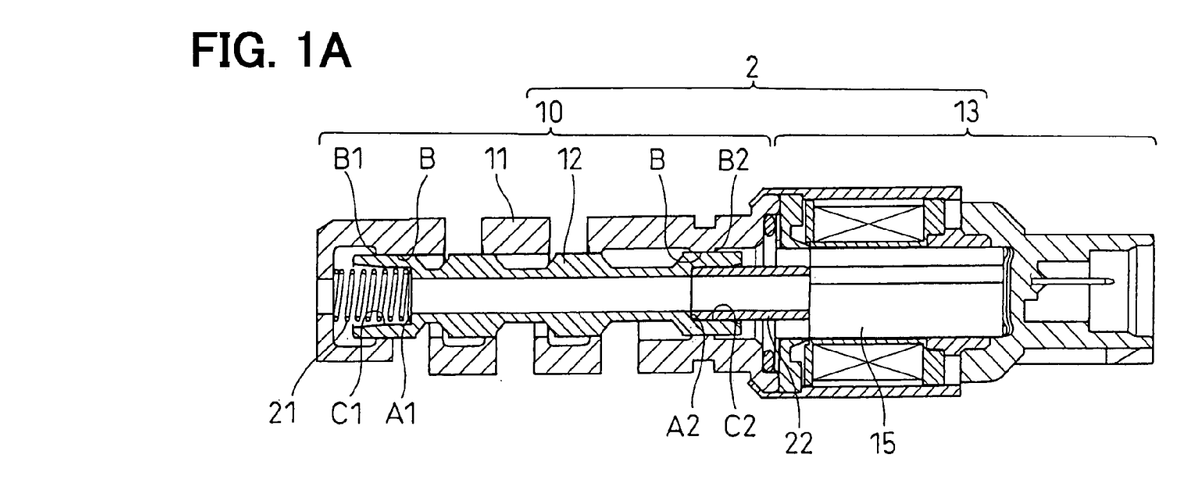
FIG. 1A is a cross-sectional side view of an oil-flow control valve (OCV) of a solenoid spool valve according to the present invention.
Figure 2:
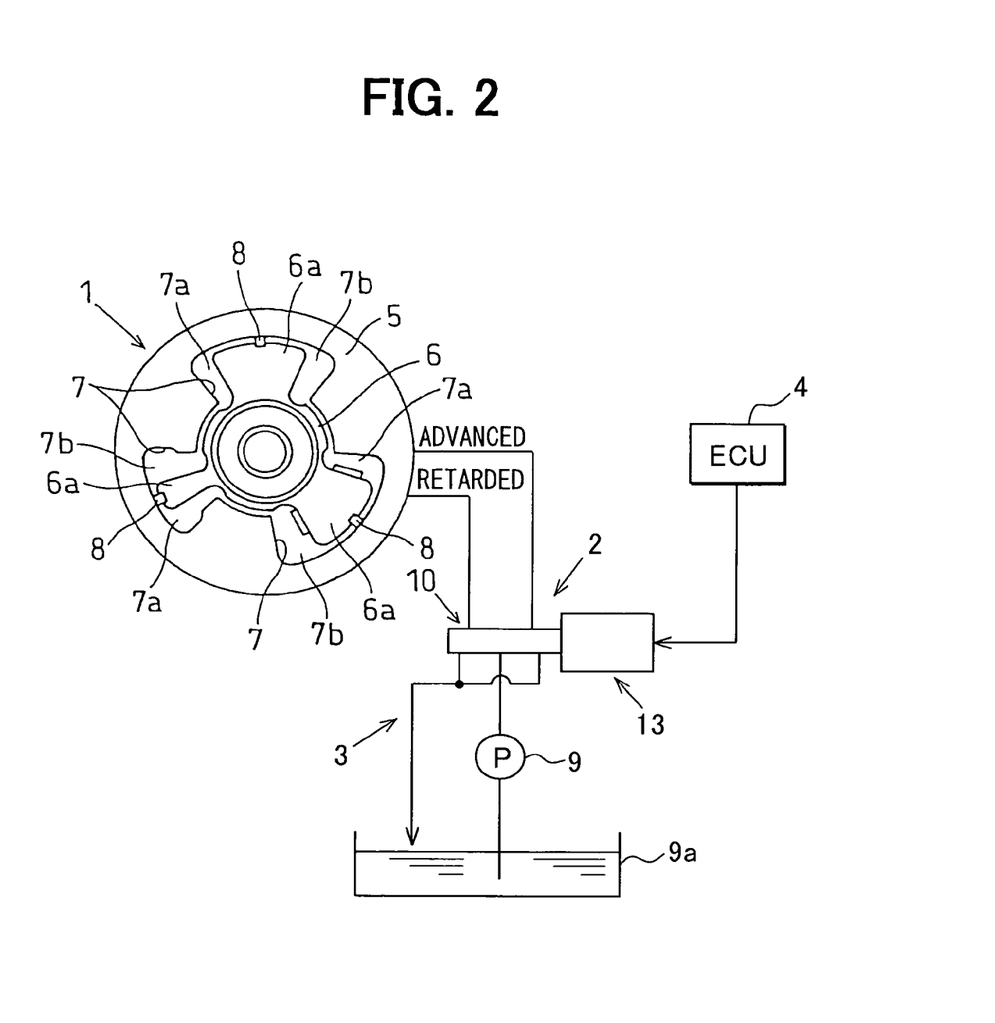
FIG. 2 is a schematic diagram of a valve variable timing device (VVT) in accordance with the solenoid spool valve of the first embodiment.

The spool valve 10 is configured such that the spring 21 energizes the spool 12 at one side (the left side in FIG. 1) and the electromagnetic actuator 13 is actuated to produce an axial force to push the spool 12 at the other side (the right side in FIG. 1).

The spool 12 has a first working face A1 which is abutted by the spring 21 and acted upon by the energizing force produced by the spring 21. The spool 12 also has a second working face A2 which is abutted by the shaft 22 and acted upon by the driving axial force produced by the plunger 15.

That is, the spool 12 is subjected to the force exerted by the spring 21 at the first working face A1 on the left side in FIG. 1 as well as the force exerted by the shaft 22 at the second working face A2 on the right side in FIG. 1.

On the other hand, the sleeve 11 is provided therein with bearings B which slidably support the spool 12. The bearing B is the inner circumferential face of the sleeve 11 which slidably contacts with the spool 12. The bearing B has a clearance formed between the spool 12 and the sleeve 11 to allow the spool 12 to slide.

The inclination of the spool 12 is restricted at both the axial ends B1 and B2 of the bearing B (the outermost ends of all the bearings B which support the spool 12).

Figure 1B:
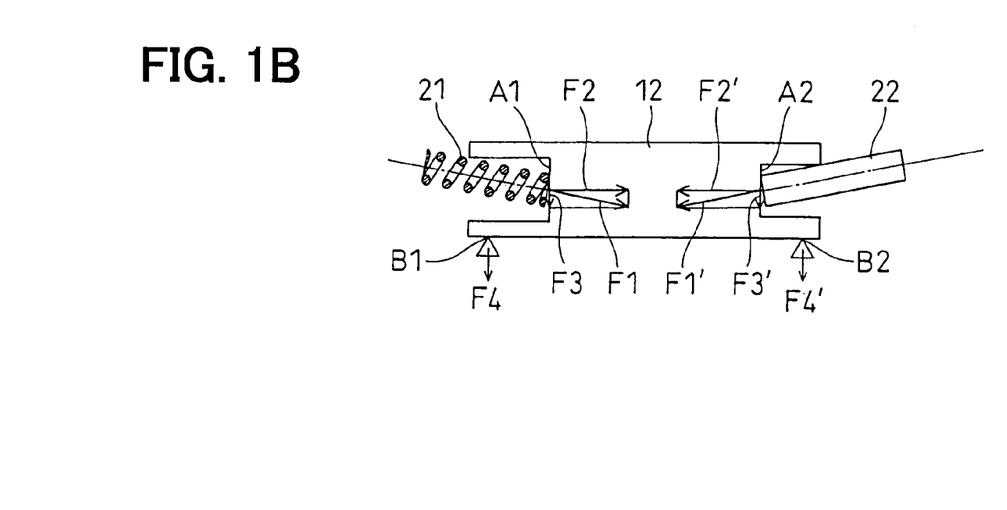
FIG. 1B is a side view of the OCV of FIG. 1A being actuated in accordance with a first embodiment of the solenoid spool valve of the present invention.

As shown on the left side in FIG. 1(b), an inclination or misalignment of the spring 21 would cause an inclined force F1 to be applied to the spool 12. The inclined force F1 is a combination of an axial force F2 (a force pushing the spool 12 axially backward) and a radial force F3 (a force pushing the bearing B radially). Accordingly, an inclination or misalignment of the spring 21 would cause a radial load F4 to be imposed by the spool 12 on the bearing B.

Likewise, as shown on the right side in FIG. 1(b), an inclination or misalignment of the shaft 22 would cause an inclined force F1' to be applied to the spool 12. The inclined force F1' is a combination of an axial force F2' (an axial force driving the spool 12) and a radial force F3' (a force pushing the bearing B radially). Accordingly, an inclination or misalignment of the shaft 22 would cause a radial load F4' to be imposed by the spool 12 on the bearing B.

In the conventional technique, the first and second working faces A1 and A2 were located axially outside the ends B1 and B2, respectively, such that the points to which an effort force was applied (the first and second working faces A1 and A2) stayed outside the fulcrums (the ends B1 and B2). In this arrangement, an inclination or misalignment of the spring 21 or the shaft 22 would cause the radial loads F4 and F4' imposed on the bearing B to increase following the principle of lever. This in turn caused part of the bearing B to be rubbed hard against part of the spool 12 resulting in an increase in friction, thereby impeding smooth movement of the spool 12.

To avoid this drawback, as shown in FIG. 1, the first embodiment is adapted such that the first and second working faces A1 and A2 are disposed axially inside the ends B1 and B2.

In the first embodiment, there are formed first and second axially recessed portions C1 and C2 on both the ends of the spool 12, with the first and second working faces A1 and A2 formed on the bottom face of the first and second recessed portions C1 and C2. Thus, the first and second working faces A1 and A2 are disposed axially inside the ends B1 and B2.

The first and second working faces A1 and A2 are disposed axially inside the ends B1 and B2 irrespective of the presence of operation of the electromagnetic actuator 13.

Additionally, the first and second working faces A1 and A2 are located near the ends B1 and B2, respectively, i.e., inside the sliding face of the bearing B (or near inside the sliding face).

As shown in FIG. 1(b), the OCV 2 provided as described above allows the two points of effort force (the first and second working faces A1 and A2) to stay between the two fulcrums (the ends B1 and B2). Accordingly, an inclination or misalignment of the spring 21 or the shaft 22 would cause the radial forces F3 and F3' to be produced on the spool 12 between the ends B1 and B2. Based on the principle of lever, it is thus made possible to minimize the radial loads F4 and F4' imposed by the spool 12 on the bearing B.

The radial loads F4 and F4' imposed by the spool 12 on the bearing B are reduced in this manner. It is thus made possible to avoid the drawback that part of the bearing B and part of the spool 12 are rubbed hard against each other resulting in an increase in friction, thereby allowing the spool 12 to move smoothly.

Furthermore, the first and second working faces A1 and A2 staying between the ends B1 and B2 make it possible to reduce the space for accommodating the spring 21 and the shaft 22, thereby reducing the entire length of the spool valve 10.

The OCV 2 according to the first embodiment has the first and second working faces A1 and A2 provided on the bottom face of the first and second recessed portions C1 and C2 which are formed on the ends of the spool 12. This arrangement allows the first and second working faces A1 and A2 to be disposed axially inside the ends B1 and B2.

Furthermore, the OCV 2 according to the first embodiment has the first and second working faces A1 and A2 which are disposed between the ends B1 and B2 irrespective of the presence of operation of the electromagnetic actuator 13. This makes it always possible to minimize the radial loads F4 and F4' imposed by the spool 12 on the bearing B. This allows the spool 12 to move smoothly irrespective of the presence of operation of the electromagnetic actuator 13.

Furthermore, the OCV 2 according to the first embodiment makes it possible to avoid an increase in slide resistance of the spool 12 caused by an inclination or misalignment of the spring 21 or the shaft 22, thereby allowing the shaft 22 to slide smoothly. It is thus made possible to enhance the performance of the WT which includes the hydraulic circuit 3 employing such an advantageous OCV 2 and the VCT 1.

Figure 4:
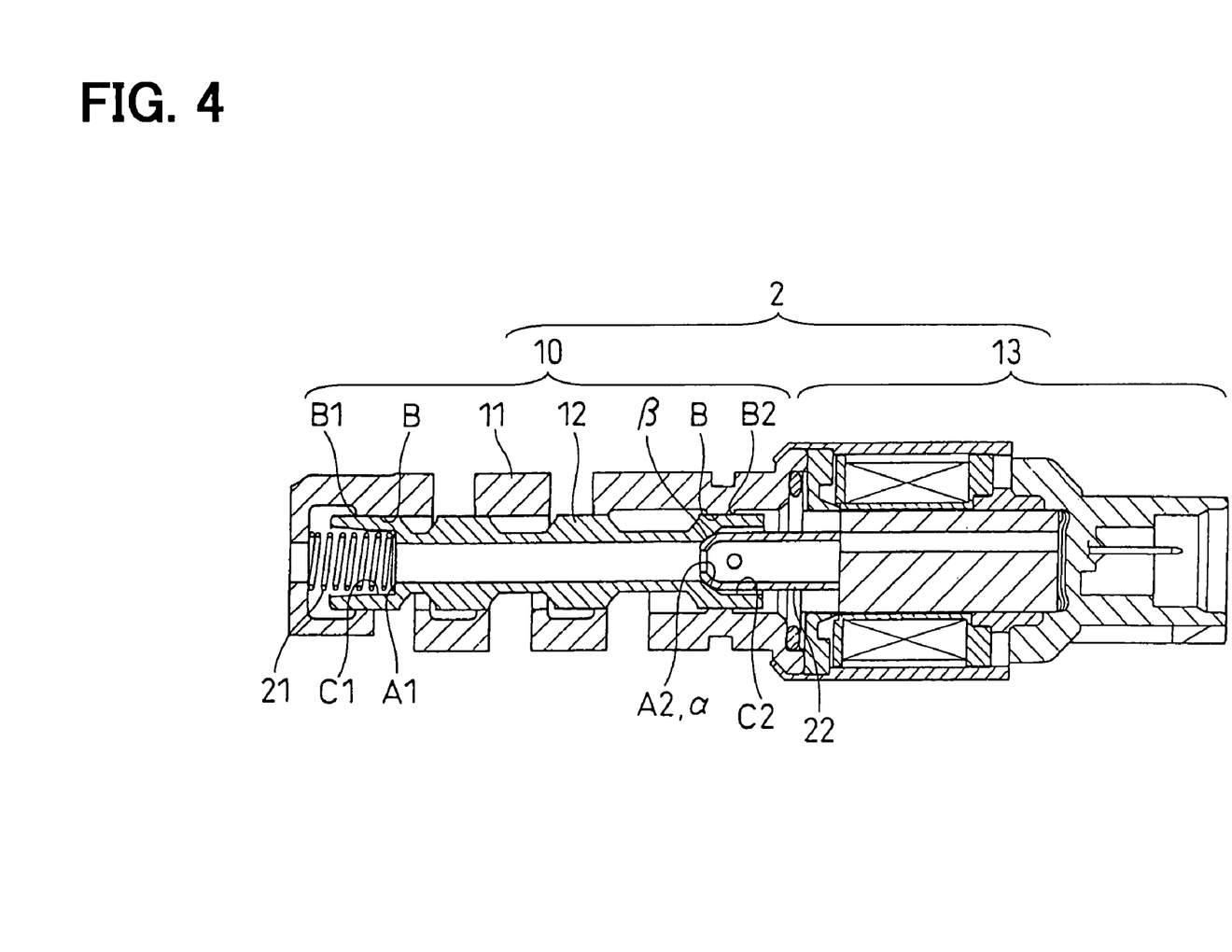
FIG. 4 is a cross-sectional side view of a second embodiment of an oil-flow control valve (OCV) of a solenoid spool valve according to the present invention.

A second embodiment will be now explained with reference to FIG. 4. In FIG. 4, the same reference symbols as those of the first embodiment indicate the same functional components.

In the second embodiment, the bottom face of the second recessed portion C2, serving as the second working face A2, is provided on the tapered face α which is opened toward the electromagnetic actuator. Additionally, the pressure-applying face of the shaft 22 (the pressure-applying face on the electromagnetic actuator side) which pushes the bottom face of the second recessed portion C2 serving as the second working face A2 is provided on a spherical surface β.

As mentioned above, the second working face A2 is provided on the tapered face α, and the pressure-applying face of the shaft 22 that abuts against the tapered face α is provided on the spherical surface β. This arrangement allows the shaft 22 to be sustained while being attracted toward the axial center of the spool 12, thereby preventing the misalignment of the shaft 22 on the second working face A2.

On the other hand, the spool 12 contacts with the shaft 22 between the tapered face α and the spherical surface β at an annular contact portion, which will be formed at a fixed position within the tapered face α even when the shaft 22 is inclined. This makes the contact condition stable even in the presence of an axial misalignment between the spool 12 and the shaft 22.

Thus, the radial load which results from an inclination or misalignment of the shaft 22 and which is imposed on the bearing B (a force pushing the bearing) is prevented, thereby allowing the spool 12 to more smoothly slide.

In the aforementioned embodiments, such an example has been shown in which the shaft 22 is inserted into the second recessed portion C2 formed on the end portion of the spool 12 to support the shaft 22 within the inner diameter of the second recessed portion C2. However, the shaft 22 may also be supported on the inner circumferential face of a cylindrical collar disposed in the sleeve 11 or the stator 16, or alternatively, the shaft 22 may be secured to the plunger 15. The self-weight of the shaft 22 may be thus prevented from being imposed on the spool 12.

By preventing the self-weight of the shaft 22 from being imposed on the spool 12 in this manner, it is possible to avoid the drawback that the self-weight of the shaft 22 causes the radial force F3' to be produced on the spool 12. This allows the radial load F4' imposed on the bearing B to be further reduced, thereby providing further reduced friction between the spool 12 and the bearing B.

The VCT 1 according to the aforementioned embodiments has been shown only by way of example for illustration purposes. Thus, any other structure may also be employed so long as the structure can provide advanced angle control using a hydraulic actuator inside the VCT 1.

For example, in the aforementioned embodiments, such an example has been shown in which the three recessed portions 7 are formed in the shoe housing 5 and the three vanes 6a are provided on the outer circumferential portion of the vane rotor 6. However, one or more recessed portions 7 or vanes 6a may be employed, and thus a different number of recessed portions 7 or vanes 6a may also be employed.

Furthermore, such an example has been shown in which the shoe housing 5 rotates in sync with the camshaft and the vane rotor 6 rotates integrally with the camshaft. However, alternatively, the vane rotor 6 may be rotated in sync with the camshaft, while the shoe housing 5 rotates integrally with the camshaft.

In the aforementioned embodiments, such an example has been shown in which employed is the spool 12 having the increased-diameter portions 12a and the reduced-diameter portions 12b to 12d. However, the structure of the spool 12 is not limited thereto, but a cylindrical spool may also be employed, for example.

In the aforementioned embodiments, such an example has been shown in which holes are created on the side face of the sleeve 11 to form the input and output ports (such as the hydraulic pressure supply port 11b, the advanced-angle chamber communication port 11c, and the retarded-angle chamber communication port 11d in the embodiments). However, the structure of the sleeve 11 is not limited thereto. For example, through holes may be provided in the direction of diameter of the sleeve 11 to form a plurality of input and output ports.

The structure of the electromagnetic actuator 13 according to the aforementioned embodiments has been shown only by way of example for illustration purposes, and it is thus possible to employ other structures. For example, such a structure may also be accepted in which the plunger 15 is placed in the axial direction of the coil 17.

In the aforementioned embodiments, such an example has been shown in which the spool 12 displaces toward the anti-coil side when the coil 17 is turned on. However, in contrast, such an example may also be employed in which the spool 12 displaces toward the coil side when the coil 17 is turned on.

The present invention has been applied to the OCV 2 which is combined with the VCT 1. However, the present invention can also be applied to other OCVs such as those employed for the hydraulic controller of an automatic transmission.

In the aforementioned embodiments, such an example has been shown in which the present invention is applied to the OCV 2 for switching and controlling hydraulic pressure. However, the present invention can also be applied to other solenoid spool valves (e.g., a gas or air switching solenoid spool valve, or a water or fuel switching solenoid spool valve).

What is claimed is:
1. A solenoid spool valve comprising:
a spool valve having a generally cylindrical sleeve provided with a fluid input port, a fluid output port, and a spool supported in the sleeve for axial displacement;
a spring abutting a first working face of said spool to energize said spool in a first axial direction; and
an electromagnetic actuator for providing an axial drive force to a second working face of said spool in a second axial direction that is substantially opposite to said first axial direction, wherein
said first and second working faces disposed axially inside opposite axial end portions of a bearing that slidably supports said spool in said sleeve, said second working face is formed in an axially recessed portion at an end portion of said spool disposed near said electromagnetic actuator, the bottom face of said recessed portion serving as said second working face is tapered and opened torward said electromagnetic actuator, and a pressure-applying face of said electromagnetic actuator for pushing the bottom face of said recessed portion serving as said second working face is spherical.

2. The solenoid spool valve according to claim 1, wherein said first and second working faces are formed on bottom faces of axially recessed portions located at the end portions of said spool, respectively.

3. The solenoid spool valve according to claim 1, wherein said first and second working faces are disposed axially inside of the axial end portions of said bearing in said sleeve, respectively, irrespective of the presence of said electromagnetic actuator.

4. The solenoid spool valve according to claim 1, wherein said first and second working faces are disposed near the two axial end portions of said bearing in said sleeve, respectively.

5. The solenoid spool valve according to claim 1, the solenoid spool valve including an oil-flow control valve for switching a flow of oil by actuating said electromagnetic actuator, said oil-flow control valve comprising:

a rotationally driven body rotationally driven in sync with a crankshaft of an internal combustion engine, and a rotational follower provided rotatably relative to the rotationally driven body and rotated integrally with a camshaft of said internal combustion engine, wherein said oil-flow control valve is combined with a valve timing variable mechanism, said valve timing variable mechanism supplying an hydraulic pressure to an advanced-angle chamber defined between said rotationally driven body and said rotational follower to thereby displace said camshaft toward the advanced angle side in conjunction with said rotational follower relative to said rotationally driven body as well as supplying a hydraulic pressure to a retarded-angle chamber defined between said rotationally driven body and said rotational follower to thereby displace said camshaft toward the retarded angle side in conjunction with said rotational follower relative to said rotationally driven body, and during actuation of said internal combustion engine, a hydraulic pressure produced in a hydraulic pressure source is relatively supplied to or released from said advanced-angle chamber and said retarded-angle chamber.

* * * * *